United States Patent [19]
Bidanset

[11] 3,982,616
[45] Sept. 28, 1976

[54] LATCH OPERATED CENTRIFUGALLY RELEASED SAFETY CLUTCH FOR SAWS

[75] Inventor: Edward J. Bidanset, Amawalk, N.Y.

[73] Assignee: Textron, Inc., Providence, R.I.

[22] Filed: July 25, 1975

[21] Appl. No.: 599,059

[52] U.S. Cl. ............................ 192/104 C; 192/28; 192/17 D; 192/103 C; 192/105 CD; 192/114 R; 192/145
[51] Int. Cl.² .................. F16D 21/08; F16D 67/02
[58] Field of Search ......... 192/103 B, 103 C, 104 B, 192/104 C, 114 R, 28

[56] References Cited
UNITED STATES PATENTS

| | | |
|---|---|---|
| 3,635,319 | 1/1972 | Bleibtreu et al. ................... 192/28 |
| 3,785,465 | 1/1974 | Johansson ...................... 192/104 C |
| 3,807,538 | 4/1974 | Johansson ...................... 192/104 C |

*Primary Examiner*—Benjamin W. Wyche
*Attorney, Agent, or Firm*—Robert E. Burns; Emmanuel J. Lobato; Bruce L. Adams

[57] ABSTRACT

A safety coupling for quickly disconnecting a cutting instrumentality from the power source of a hand-held power tool comprises a pawl on a rotating driving member engaging an abutment on a coaxial driven member. During normal operation a trip arm holds the pawl engaged. When the trip arm is tripped to release the pawl, a latch prevents reengagement of the pawl until reset.

14 Claims, 4 Drawing Figures

LATCH OPERATED CENTRIFUGALLY RELEASED SAFETY CLUTCH FOR SAWS

FIELD OF INVENTION

The present invention relates to safety couplings which are particularly applicable to hand held power tools utilizing a rotating or rapidly translating cutting element. In the event of reaction forces that cause an uncontrollable hazardous condition that might cause injury to the user or nearby persons, the coupling disconnects the cutting element from the power source so as to bring the cutting element quickly to a stop.

BACKGROUND OF THE INVENTION

The widespread use of portable power tools in the construction, lumbering and consumer markets has emphasized the need for effective user safeguards. Lighter weight, reduced vibration and higher power have resulted in very efficient cutting tools that are widely used by skilled, semiskilled and unskilled operators. As with any power driven machine they represent a potential hazard to the user if suitable safeguards are not provided. Thus, for example in the case of chain saws which are becoming more and more widely used by householders as well as by construction workers and woodsman, a potential hazard is presented by the phenomenon known as "kickback." A kickback can be produced by a chain saw when the cutting elements on the chain momentarily are caught or seized by the work material. The kinetic energy of the chain normally used to remove chips of the material being cut is suddenly transferred to the chain bar to which it imparts a force causing the chain bar to kick up toward the operator. The magnitude of the kickback force is related to the speed of the chain and the nature of engagement of the chain with the work material. In order to avoid possible injury to the operator it is desirable to provide means for stopping the chain before the chain bar can come into contact with the operator. For this purpose it has been proposed to provide a chain saw with a brake or other device for stopping the chain in the event of a kickback or other hazardous mishap. However, because of the inertia of the engine and the drive line between the engine and the cutting chain, it is difficult to stop the chain in a sufficiently short period of time.

It has also been proposed to provide a quick disconnect coupling between the engine and the sprocket by which the chain is driven. However, the couplings sofar proposed have left much to be desired in constructional and operational characteristics. By way of example one proposed coupling has the undesirable characteristic that after the coupling has disengaged at operating speed there is a possibility of its reengagement when the engine slows down as a result of the operator releasing the usual throttle-operating trigger. Another coupling heretofore proposed is undesirably complex in construction and operation and requires two manual operations to reset the coupling, one to reengage the coupling and the other to reset the actuating mechanism.

SUMMARY OF INVENTION

An object of the invention is to provide a safety coupling which is of simple construction and reliable in its operation. In accordance with the invention a safety latch prevents reengagement of the coupling after it has been tripped until it is reset by the operator. The resetting operation is simplified in that a single manipulation by the operator releases the safety latch, reconnects the coupling and resets the tripping mechanism.

The safety coupling in accordance with the invention is desirably combined with a brake for quickly stopping the driven element when the coupling is disconnected. A single actuating element is operable when moved in one direction to release the coupling and apply the brake and when moved in another direction to release the brake, release the safety latch, reconnect the coupling and reset the actuating mechanism.

BRIEF DESCRIPTION OF DRAWINGS

The nature, objects and advantages of the invention will be more fully understood from the following description of a preferred embodiment illustrated by way of example in the accompanying drawings in which a safety coupling in accordance is shown as applied to a chain saw in which it is associated with a centrifugal clutch and a brake.

Figure 1:
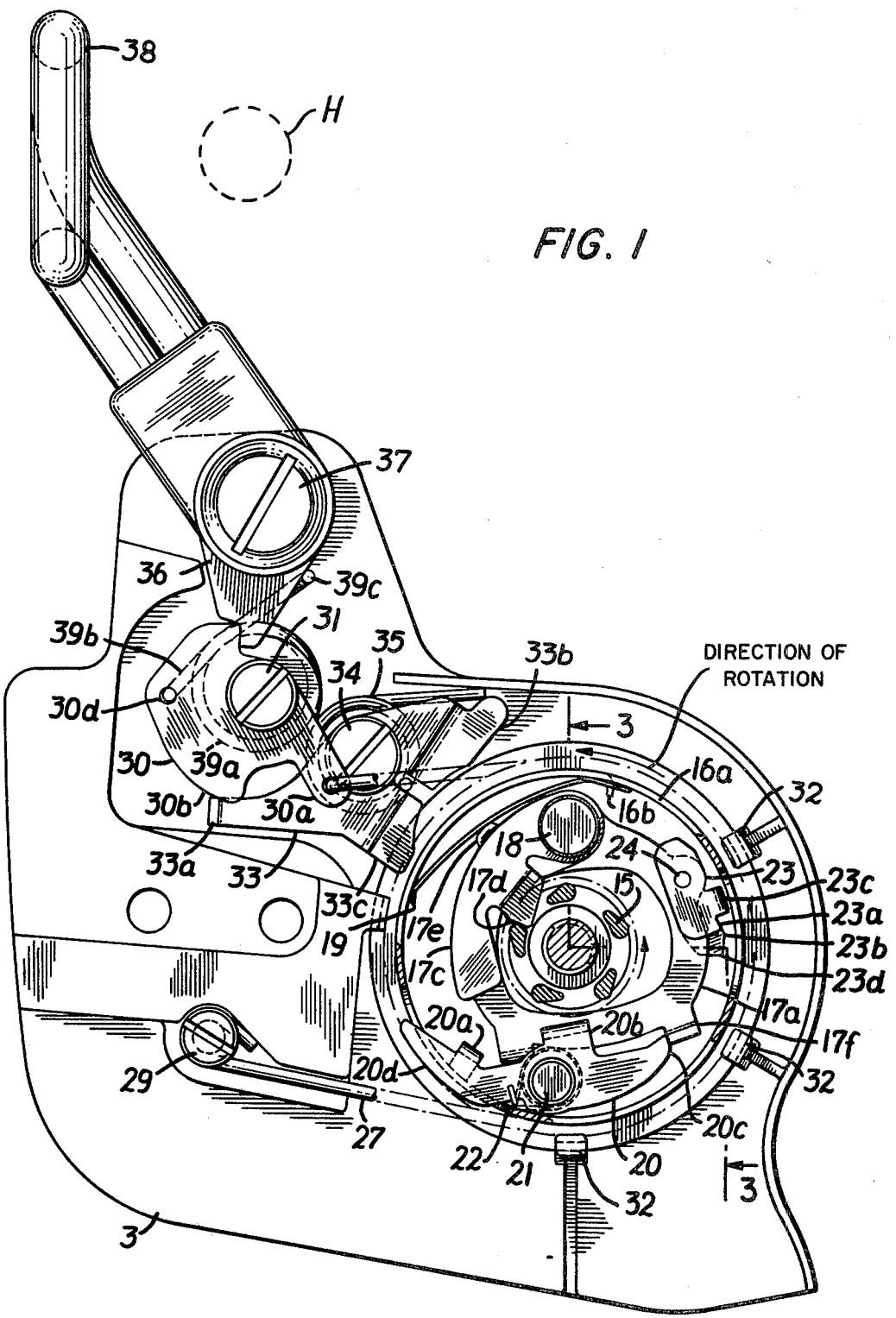
Figure 2:
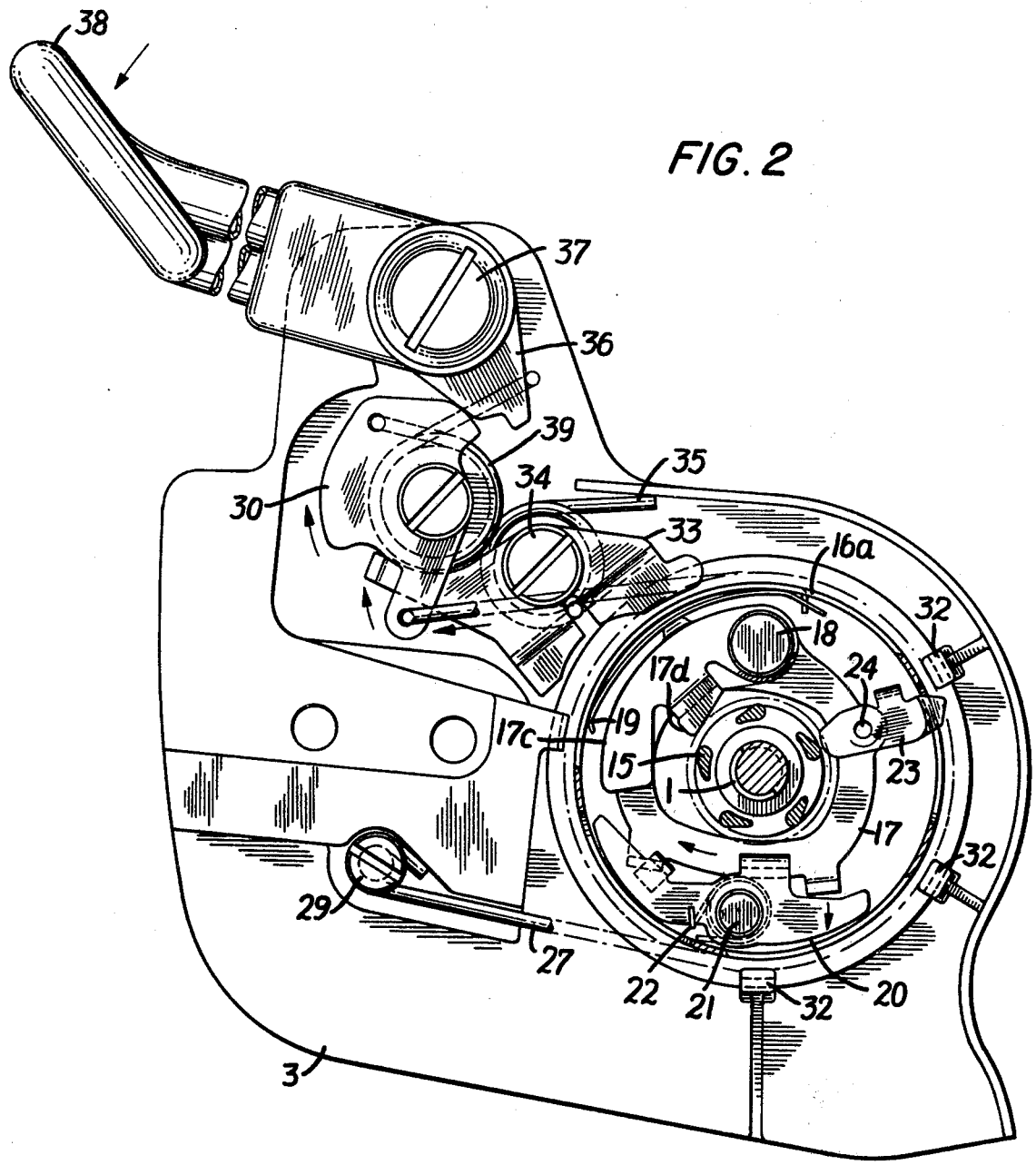
Figure 3:
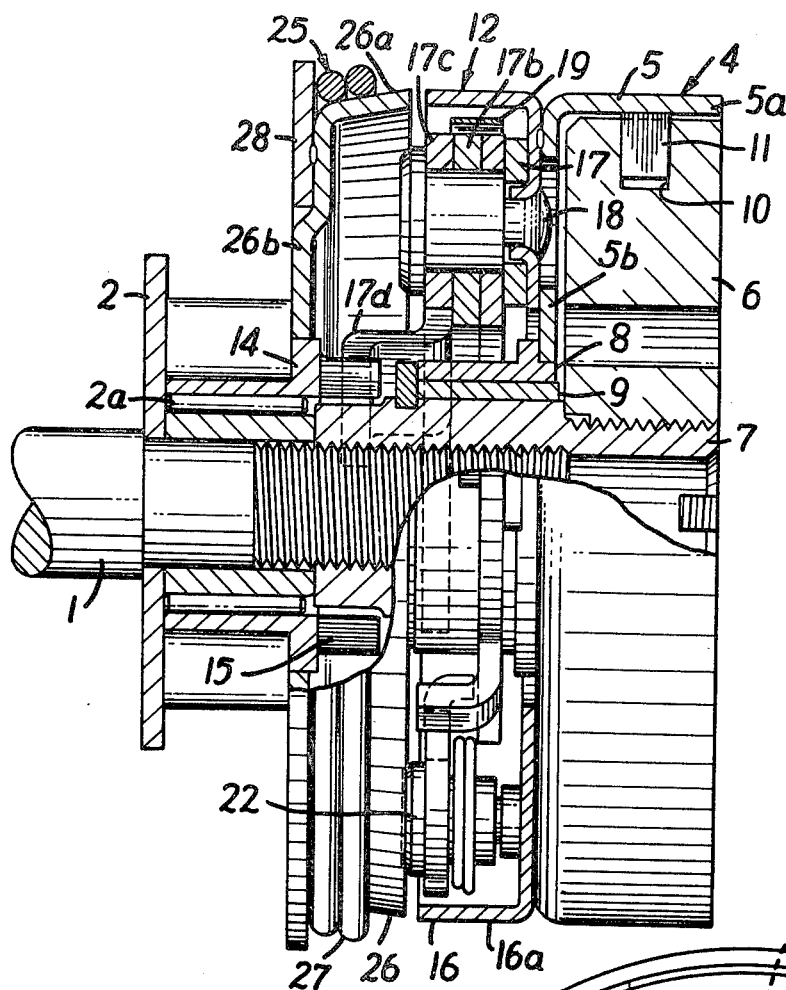
Figure 4:
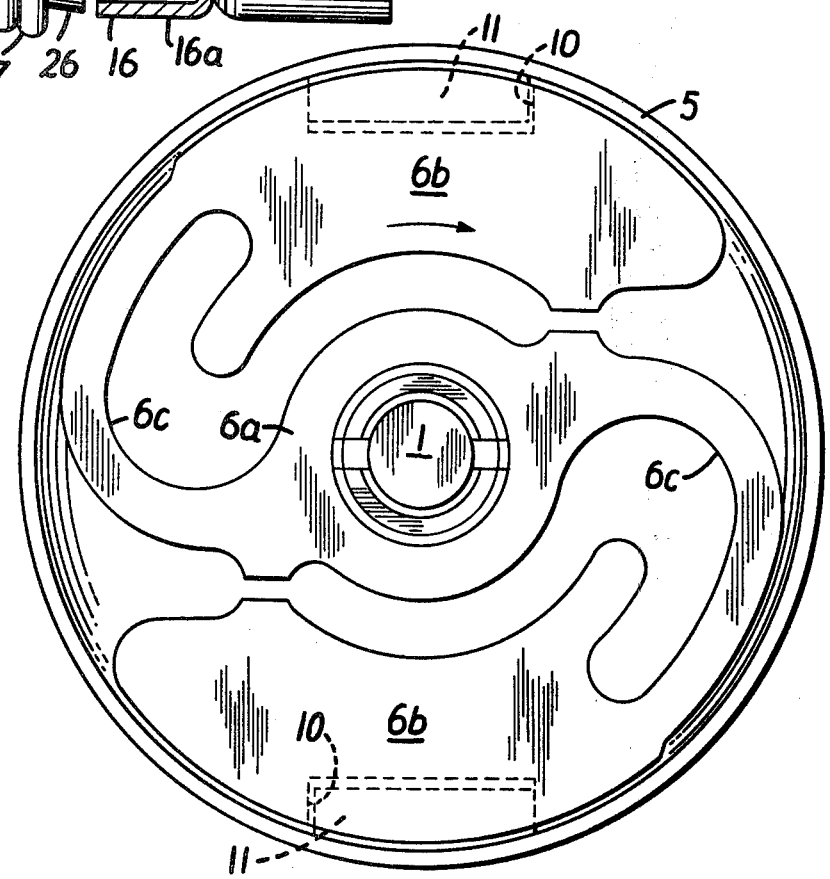

IN THE DRAWINGS:

FIG. 1 is a side view of a safety coupling-brake-centrifugal clutch assembly together with actuating mechanism shown in normal operating condition with the coupling engaged and the brake released;

FIG. 2 is a similar view but showing the actuating mechanism in "tripped" condition, the coupling disengaged and the brake applied;

FIG. 3 is a cross sectional view of the safety coupling, brake and centrifugal clutch taken approximately on the line 3—3 in FIG. 1; and FIG. 4 is an end view of the centrifugal clutch as seen from the right hand side of FIG. 3.

DESCRIPTION OF PREFERRED EMBODIMENT:

A preferred embodiment of a safety coupling in accordance with the invention is shown by way of example in the drawings as applied to a chain saw in which it is associated with a centrifugal clutch and a brake. The centrifugal clutch and safety coupling together provide a driving connection between a drive shaft 1, for example the engine crankshaft or crankshaft extension, and a sprocket 2 by which the cutting chain of the chain saw is driven. The sprocket 2 is rotatably mounted on the drive shaft 1 by a needle bearing 2a. The centrifugal clutch is disengaged at idling speed of the engine and engages when the engine speed exceeds a selected value. The safety coupling is engaged during normal operation of the chain saw and disengages in the event of a "kickback" or other mishap. The brake is normally disengaged but is actuated concurrently with the disengagement of the safety coupling to bring the sprocket 2 and hence the cutting chain quickly to a stop. Actuating means is operable to disengage the safety coupling and simultaneously apply the brake. The same actuating means is operable in reverse direction to release the brake, release the safety latch of the coupling and reengage the coupling. The operating mechanism and the brake are shown installed on the inner side of a drive case cover 3 which is removably secured to the housing of the powerhead of the chain saw and encloses the centrifugal clutch-safety coupling-chain sprocket assembly.

The centrifugal clutch 4 is shown in the drawings as comprising a drum 5 and a rotor 6. The rotor has a hub portion 6a which is internally threaded and is screwed onto a shaft extension 7, one end of which is internally threaded so as to be screwed onto a threaded end portion of the shaft 1 while the opposite end portion is externally threaded to receive the rotor of the centrifugal clutch. Opposite weight portions or shoes 6b are connected with the hub portion 6a by integral spring arm portions 6c.

The drum 5 of the centrifugal clutch 4 comprises a cylindrical rim portion 5a and a centrally apertured radial portion 5b which is fixed to a sleeve 8 rotatably supported on the shaft extension 7 by an Oilite bearing 9. When the shaft 1 is stationary or is rotating at low speed, the shoe portions 6b of the rotor are disengaged from the drum. When the speed of the shaft 1 is increased so as to exceed a selected value the shoe portions 6b of the rotor are pressed outwardly by centrifugal force into engagement with the inner surface of the rim portion 5a of the drum so as to provide a driving connection between the shaft 1 and the drum of the centrifugal clutch.

The shoe portions 6b of the centrifugal clutch rotor are provided in their peripheral surfaces with oppositely disposed recesses 10 which receive auxiliary weights or shoes 11. The auxiliary shoes are received in the recesses 10 with sufficient clearance so as to be freely movable in a radial direction relative to the shoe portions 6b. The auxiliary shoes 11 have arcuate outer faces which conform to the inner surface of the rim portion 5a of the clutch drum. When the engine driving the shaft 1 is running at idling speed, the shoes 6b of the centrifugal clutch rotor are held disengaged from the drum by the spring arm portions 6c. However, the auxiliary shoes 11 are pressed outwardly against the inner surface of the rim portion 5a of the drum by centrifugal force as illustrated in FIG. 4 so as to apply a low torque tending to rotate the drum. The torque thus applied to the drum is sufficient to rotate the drum if the safety coupling interposed between the centrifugal clutch and the chain driving sprocket 2 is disengaged. However, the torque is not sufficient to drive the sprocket 2 and the chain. Hence, the centrifugal clutch drum will remain stationary when the engine is running at idling speed if the safety clutch is engaged so as to connect the centrifugal clutch drum with the chain driving sprocket. When the engine speed is increased to a selected value, the shoes 6b of the clutch rotor are pressed outwardly by centrifugal force into engagement with the rim portion 5a so as to provide a driving connection between the rotor and the drum. The recesses 10 are of sufficient depth to receive the auxiliary shoes 11 fully in the recesses so that their outer faces are flush with and form continuations of the outer peripheral surfaces of the shoes 6b. Sufficient clearance is provided at the bottom of the recess to assure that the auxiliary shoes 11 do not interfere with engagement of the main shoes 6b with the drum.

The safety clutch 12 comprises two coaxial rotatable members, one of which carries a pivotally mounted pawl which is engageable with an abutment on the outer member to provide a driving connection between the two members. When the coupling is "tripped" the pawl is disengaged from the abutment so that the coupling is disconnected. A safety catch holds the pawl disengaged until reset.

As illustrated by way of example in the drawings the rotatable member having an abutment engageable by the pawl comprises an annular flanged member 14 which is coaxial with the drive shaft 1 and forms a unitary structure with the chain driving sprocket 2. The flanged member 14 is provided with a plurality of abutments in the form of projections 15 which extend in a direction toward the centrifugal clutch 4. While a number of such abutments can be varied as desired, there are five equally spaced abutments shown by way of example in the drawings. As illustrated in FIGS. 1 and 2, the abutments are of avoid shape in cross section so as to provide greater strength in the space available.

The second rotatable member which carries a pivotally mounted pawl is shown in the drawings as a dished member 16 which is disposed back-to-back with the clutch drum 5 and is fixed to the clutch drum, for example by welding. A pawl 17 is pivotally mounted on the member 16 by means of a post 18 which is located eccentrically of the axis of the drive shaft 1. As illustrated in FIGS. 1 and 2, the pawl 17 comprises a somewhat irregularly shaped annular member 17a which encircles and is spaced radially outwardly of the drive shaft 1. The pawl further comprises an arcuate weight portion 17b and an arcuate nose carrying portion 17c. The weight portion 17b and the nose carrying portion 17c have an angular extent of approximately a third of a circle as seen in FIGS. 1 and 2. While the annular portion 17a and the arcuate portions 17b and 17c of the pawl may conveniently be formed of sheet or plate stock, they are secured together for example by welding to form a unitary structuae. The arcuate portion 17c has a radially inwardly projecting nose portion 17d which as seen in FIG. 3 is offset axially in a direction toward the sprocket 2 so as to be engageable with one or another of the projections 15 on the flange member 14 of the sprocket.

The pawl 17 is swingable about the pivot post 18 between an engaged position as shown in FIG. 1 in which the nose 17d is engaged with one of the projections 15 on the flanged member 14 of the sprocket to provide a driving connection between the sprocket and the drum 5 of the centrifugal clutch 4 and a disengaged position as illustrated in FIG. 2 in which the nose 17d of the pawl is outside the circle of the projections 15 and hence out of engagement with the projections so that there is no driving connection between the sprocket 2 and the drum of the centrifugal clutch. A light leaf spring 19 disposed between the pawl and a rim portion 16a of the rotatable member 16 and retained in place by a tab 16b acts on a projection 17e of the pawl to bias the pawl toward engaged position as shown in FIG. 1. However, because of the eccentrically located weight portion 17b and the nose carrying portion 17c, the center of gravity of the pawl is located eccentrically of the pivot post 18 and the drive shaft 1 so as to provide a centrifugal force tending to move the pawl toward disengaged position as shown in FIG. 2 when the centrifugal clutch drum 5 and rotatable member 16 are rotating. The strength of the spring 19 and the weight and eccentricity of the pawl are selected so that when the clutch drum is stationary or is rotating at low speed the pawl is held in engaged position by the spring 19 as shown in FIG. 1. When the drive shaft 1 is rotated at a speed sufficient to cause the shoes 6b of the rotor of the centrifugal clutch to engage the drum the centrifugal force acting on the pawl 17 is sufficient to overcome the force of the spring 19 and thereby bias the pawl in a direction to disengage the nose portion 17d from the projections 15 on the flanged member 14 and thereby disconnect the coupling. However, latch means is provided to prevent the disengagement of the pawl unless the latch means is released upon the occurrence of a kickback or other happening which makes it desirable to disconnect the coupling.

The latch means for retaining the lug 17 in engaged position is illustrated in the drawings as comprising a trip arm 20 which is pivotally mounted on the rotatable member 16 by a pivot post 21. A J-shaped lug 20a on the trip arm 20 extends through a slot in the rotatable member 16 to limit the pivotal movement of the trip arm about the post 21. An L-shaped lug 20b on the trip arm engages the adjacent face of the pawl 17 to locate the trip arm relative to the pawl. The trip arm 20 has a nose portion 20c which is engageable with a lug 17f on the pawl to retain the pawl in engaged position as shown in FIG. 1. A tail portion 20d of the trip arm projects out through a cutout in the rim portion 16a of the rotatable member 16 so as to extend beyond the periphery of the rotatable member 16 when the trip arm is in engaged position as shown in FIG. 1. The tail portion 20d of the trip arm is engageable by actuating means as described below for rotating the trip arm from the engaged position shown in FIG. 1 to the released position as shown in FIG. 2. The nose portion 20c of the trip arm is thereby disengaged from the lug 17f of the pawl so as to permit the pawl to pivot to the position shown in FIG. 2 in which the nose portion of the pawl is disengaged from the projections 15 and the coupling 12 is thereby disconnected.

A light torsion spring 22 biases the trip arm 20 toward released position. However, the center of gravity of the trip arm is disposed eccentrically of the pivot post 21 so that when the member 16 is rotating the centrifugal force acting on the trip arm overpowers the light torsion spring 22 and tends to rotate the trip arm to a position in which the nose portion 20c is engageable with the lug 17f of the pawl as shown in FIG. 1.

Second latch means is provided for preventing reengagement of the pawl 17 with the projections 15 after the pawl has been released by the trip arm 20. The second latch means is operative to retain the pawl in disengaged position until the mechanism has been reset by manual operation of the actuating means as described below.

In the drawings the second latch means is illustrated as comprising a release arm 23 which is pivotally mounted on the annular member 17a of the pawl by a pivot pin 24. The release arm 23 comprises two parallel portions 23a and 23b which are disposed on opposite sides of the annular member 17a of the pawl and are connected by a rounded tie portion 23c. The two portions 23a and 23b of the trip arm are the same shape except that one end of the portion 23b extends beyond the corresponding end of the portion 23a to provide a projecting nose portion 23d.

The release arm 23 is freely pivotal on the pin 24 and is not spring biased. However, the center of gravity of the release arm is disposed eccentrically of the pivot pin 24 so that when the member 16 and hence the pawl 17 are rotating about the axis of the shaft 1, centrifugal force biases the release arm 23 in a counterclockwise direction as seen in FIGS. 1 and 2 so as to tend to move the release arm from the position shown in FIG. 1 to the position shown in FIG. 2. When the pawl 17 is in engaged position as shown in FIG. 1 rotation of the release arm in a counterclockwise direction is prevented by engagement of the tie portion 23c with the rim 16a of the rotating member 16. The release arm is thereby retained in the position shown in FIG. 1. When the pawl moves to disengaged position as shown in FIG. 2, the release arm 23 is permitted to swing by centrifugal force to the position shown in FIG. 2 in which the nose 23d of the portion 23b extends out through a slot in the rim portion 16a of the rotatable member 16. The end of the portion of the release arm which is in a different plane from the portion 23b engages the rim of the rotatable member 16 so as to retain the pawl in disengaged position as shown in FIG. 2. When the parts are in the position shown in FIG. 2 the nose 23d of the release arm extends beyond the periphery of the rotatable member 16 so as to be engageable by actuating means as will be described below to pivot the release arm in a clockwise direction and thereby permit movement of the pawl 17 to engaged position.

The brake and brake operating mechanism are generally the same as in my copending application, Ser. No. 483,034, now U.S. Pat. No. 3,923,126, except that the actuating mechanism also actuates the safety coupling 12. As illustrated in the drawings the brake 25 comprises a brake drum 26 and a brake band 27. The brake drum 26 comprises a rim portion 26a and a radial portion 26b which extends outwardly from and forms a unitary construction with the flanged member 14 of the safety coupling. The radial portion 26b of the brake drum is offset to receive an annular flange 28 which is fixed to the brake drum for example by welding and extends radially outwardly beyond the rim portion 26a as seen in FIG. 3 so as to retain the brake band on the drum.

The brake band 27 is preferably of circular cross section as seen in FIG. 3. One end of the brake band is anchored to the drive case cover 3 by a screw 29. From the anchor screw 29 the brake band extends approximately one and one half turns helically around the brake drum 26, the other end of the brake band being connected with an arm 30a of an operating member 30 which is pivotally mounted on the drive case cover by a pivot post 31. The operating member 30 is angularly movable about its axis of rotation between two positions as illustrated respectively in FIG. 1 and in FIG. 2. In the position shown in FIG. 1, the arm 30a of the operating member acts on the adjacent end of the brake band so as to expand the helically coiled brake band and thereby disengage it from the brake drum. The drive case cover 3 is provided with suitably positioned abutments 32 which engage the brake band when in expanded condition and assist in positioning it so that the helically coiled portion of the brake band is concentric with and spaced from the periphery of the brake drum. The brake is thus released and the sprocket 2 is free to turn. In the position shown in FIG. 2 the operating member 30 has turned in a clockwise direction so that the brake band is contracted and grips the brake drum. As the brake drum rotates in a counterclockwise direction as seen in FIGS. 1 and 2, frictional forces which are generated by engagement of the brake band with the drum produce a self activating force that pulls the helically coiled portion of the brake band still tighter on the drum so as to provide a strong and effective braking action which quickly stops rotation of the drum and hence rotation of the sprocket 2.

The actuating mechanism further comprises a coupling control member 33 which is pivotally mounted on the inside of the drive case cover 3 by a shouldered screw 34. The control member 33 has an angular lug 33a engageable with a cam portion 30b of the operating member 30. A torsion spring 35 biases the member 30 in a clockwise direction so as to keep the lug 33a in engagement with the periphery of the operating member 30. The cam surface 30b is contoured so that upon pivotal movement of the operating member 30 the control member 33 is pivotally movable between the positions shown respectively in FIG. 1 and in FIG. 2. The control member 33 further has a cam portion 33b which is engageable with the projecting tail portion 20d of the trip arm 20 when the control member is in the position shown in FIG. 1. The trip arm is thereby disengaged from the lug 17a of the pawl 17 so as to permit the pawl to pivot in a clockwise direction to a position in which the nose portion 17d is disengaged from the projections 15. The control member 33 has a further cam portion 33c which is engageable with the projecting nose 23d of the release arm 23 when the control member 33 is in the position shown in FIG. 2. The release arm 23 is thereby pivoted in a clockwise direction so as to permit the pawl 17 to pivot in a counterclockwise direction so as to engage one of the projections 15 on the flanged member 14. The cam portions 33b and 33c of the control member 33 are disposed in different planes as are also the trip arm 20 and release arm 23 respectively so that the cam portion 33b is engageable only with the trip arm and the cam portion 33c is engageable only with the release arm.

Pivotal movement of the operating member 30 and hence of the coupling control member 33 is controlled by an actuating member 36 which is pivotally mounted on the inside of the drive case cover 3 by a shouldered screw 37. The actuating member 36 is rotatable relative to the drive case cover by inertia responsive means comprising a mass disposed eccentrically of the axis of rotation of the actuating member and a control spring. In the drawings the eccentric mass is shown by way of example as comprising a guard member 38 in the form of a tube bent in loop configuration so as to extend transversely of the forward portion of the powerhead of the chain saw in front of the usual transversely extending front handle, the location of which is indicated by the broken circle H. As the center of gravity of the unitary structure comprising the guard member 38 and actuating member 36 is eccentric of the pivotal axis of the actuating member, sudden acceleration of the saw resulting from a "kickback" results in movement of the saw relative to the actuating member and eccentric mass which tend to remain stationary by reason of their inertia. The result is an apparent rotation of the actuating member 36 and guard member 38 in a counterclockwise direction from the position shown in FIG. 1 to that shown in FIG. 2.

Moreover, the guard member 38 provides a handle by means of which the actuating member 36 can be rotated manually. By reason of the location of the guard member 38 in front of the front handle of the chain saw, the guard member is engageable by the hand or wrist of the operator in the event of a "kickback" thereby resulting in rotation of the actuating member in a counterclockwise direction relative to the saw. The guard member 38 also provides a convenient handle means for manually rotating the actuating member 36 in a clockwise direction to reset it to its normal position as shown in FIG. 1.

Operative connections are provided between the actuating member 36 and the operating member 30 so as to provide for control of the safety coupling 12 and the brake 25. As shown by way of example in the drawings an abutment 36a on the actuating member 36 is engageable with an abutment 30c of the operating member 30 so as to move the operating member pivotally in a counterclockwise direction when the actuating member 36 is moved pivotally in a clockwise direction. Moreover, a control spring acting between the operating member and the actuating member is shown as a torsion spring 39 having a helically wound portion 39a coaxial with the operating member 30. One arm 39b of the control spring has an angularly bent portion received in hole 30d of the operating member while a second arm 39c has an angularly bent portion bearing on an edge 36b of the actuating member 36. The control spring thus biases the operating member 30 in a clockwise direction and biases the actuating member 36 also in a clockwise direction. The line of action of the force exerted by the control spring is such that when the operating member 30 and the actuating member 36 are in "set" position as illustrated in FIG. 1, the spring tends to hold them in such position. The force exerted by the control spring is such that the operating member 30 and the actuating member 36 are retained in set position despite vibration and normal movements occurring in the operation of the saw. However, in the event of predetermined acceleration of the saw produced for example by a "kickback," the inertia force acting through the inertial sensor comprising the guard member 38, actuating member 36 and control spring 39 causes the operating member to rotate from the position shown in FIG. 1 to that shown in FIG. 2. When the operating member 30 and actuating member 36 are in the position shown in FIG. 2 the line of action of the force of the control spring 39 is such as to retain the members in this position. Hence, the system comprising the operating member 30, the actuating member 36 and the control spring 39 is bistable. As mentioned above the system can be reset from the position shown in FIG. 2 to that shown in FIG. 1 by manual operation of the guard member 38.

OPERATION

During normal operation of the saw, the actuating mechanism comprising the guard member 38, actuating member 36, operating member 30 and coupling control member 33 are in the position shown in FIG. 1. The pivotally mounted pawl 17 is also in the position shown in FIG. 1 so as to engage one of the projections 15 on the flanged member 14 and thereby provide a driving connection between the drum 5 of the centrifugal clutch 4 and the chain driving sprocket 2. In the event of a "kickback" or other occurrence producing a predetermined acceleration of the saw in a clockwise direction as viewed in the drawings, the guard member 38 by reason of its inertia rotates in a counterclockwise direction relative to the saw from the position shown in FIG. 1 to that shown in FIG. 2. This results in rotation of the operating member 30 in a clockwise direction so as to apply the brake 25 and also rotate the coupling control member 33 in a clockwise direction to the position shown in FIG. 2. The cam portion 33b is thereby moved to a position in which it is engaged by the projecting tail portion 20d of the trip arm 20. The nose of the trip arm is thereby disengaged from the lug 17f of the pawl 17 permitting the pawl to pivot in a clockwise direction so as to be disengaged from the projections 15. The coupling is thereby disengaged so that the sprocket 2 is no longer coupled with the centrifugal clutch 4. As the only load on the brake is the sprocket 2 and the cutting chain, the chain is brought to a stop in the matter of milliseconds. When the pawl 17 pivots to its disengaged position, the release arm 23 rotates in a counterclockwise direction to the position shown in FIG. 2 and thereby prevents reengagement of the pawl until the mechanism is reset.

In order to restore the mechanism to operating condition, guard member 38 is moved manually from the position shown in FIG. 2 to that shown in FIG. 1. The operating member 30 is thereby rotated in a counterclockwise direction so as to release the brake 25. The coupling control member 33 is also rotated in a counterclockwise direction to the position shown in FIG. 1 so as to bring the cam portion 33c in position to be engaged by the projecting nose portion of the release arm 23. Assuming that the engine is running at idling speed, the cam drum 5 and hence the rotatable member 16 are rotated by engagement of the auxiliary shoes 11 with the drum 5. The release arm 23 is thereby carried around by rotation of the member 16 and pawl 17 to bring it into engagement with the cam portion 33c of the control member 33. The release arm 23 is thereby rotated in a clockwise direction so as to permit the pawl 17 to pivot in a counterclockwise direction under the bias of the spring 19 so as to bring the nose portion of the pawl into engagement with one of the projections 15 on the flanged member 14. The pawl is thereupon latched in engaged position by the trip arm 20. As the sprocket 2 is now coupled with the drum 5 of the centrifugal clutch 4, the low torque provided by the auxiliary clutch shoes 11 is not sufficient to overcome the frictional resistance of the chain and hence the clutch drum is brought to a stop.

When the engine is accelerated to normal operating speed the main shoes 6 of the centrifugal clutch engage the drum 5 to provide a driving connection between the shaft 1 and the sprocket 2. With this increase in speed, centrifugal force acting on the pawl 17 as described above overcomes the force of the spring 19 so as to bias the pawl in a direction to disengage it from the projections 15. However, the trip arm 20 holds the pawl in engaged condition until tripped by operation of the actuating mechanism as described above.

It will thus be seen that the guard member 38 is operable by inertia or manually to disconnect the safety coupling 12 and apply the brake 25 and is operable manually in the opposite direction to release the brake 25, reset the release arm 23 and reconnect the coupling 12.

While a preferred embodiment of the invention has been shown by way of example in the drawings, it will be understood that modifications in the various parts may be made while retaining the principles of operation. The invention is thus in no way limited to the illustrated embodiment.

What I claim and desire to secure by letters patent is:

1. A safety coupling comprising a first rotatable member having at least one abutment, a second rotatable member adjacent said first rotatable member and coaxial therewith, pawl means pivotally mounted eccentrically on said second rotatable member for movement between a position in which it engages said abutment to provide a driving connection between said first and second rotatable members and a position in which it is disengaged from said abutment, first latch means for releasably holding said pawl means in engaged position, means for releasing said first latch means for movement of said pawl means to disengaged position and second latch means for thereupon preventing reengagement of said pawl means with said abutment.

2. A safety coupling according to claim 1, comprising spring means for biasing said pawl means toward engaged position.

3. A safety coupling according to claim 2, in which the center of mass of said pawl means is eccentrically located with respect to the pivot of the pawl means to provide centrifugal force acting in a direction to disengage said pawl from said abutment, said force being sufficient when said second rotatable member is rotated at or above a selected speed to overcome said biasing means and move said pawl means from engaged to disengaged position when released by said first latch means.

4. A safety coupling according to claim 1, in which said pawl means comprises an annular member encircling the axis of rotation of said rotatable members and having a nose portion engageable with said abutment.

5. A safety coupling according to claim 4, in which said first latch means comprises a trip arm pivotally mounted on said second rotatable member and having a portion engageable with said annular member in latched position of said trip arm to retain said nose portion in engagement with said abutment.

6. A safety coupling according to claim 5 comprising means for biasing said trip arm to released position when said second rotatable member is stationary, the center of mass of said trip arm being eccentrically located with respect to the pivot of said trip arm to bias said trip arm to latched position when said second rotatable member is rotating.

7. A safety coupling according to claim 5, in which said second latch means comprises a release arm pivotally mounted on said annular member for movement between an inactive position and an active position in which it retains said pawl means in disengaged position.

8. A safety coupling according to claim 7 comprising an actuating member movable between a release position in which it is engaged with said trip arm to release said annular member to disengage said nose portion from said abutment and a reset position in which it is engaged with said release arm to move said release arm to active position.

9. A safety coupling according to claim 4, in which said second latch means comprises a release arm pivotally mounted on said annular member for movement between an inactive position and an active position in which it retains said pawl means in disengaged position.

10. A safety coupling according to claim 9 comprising means for biasing said release arm toward active position and means for retaining said release arm in inactive position when said pawl means is held in engaged position by said first latch means.

11. A safety coupling according to claim 10, in which said means for biasing said release arm comprises location of the center of mass of said release arm eccentrically of the pivot of said release arm to provide centrifugal force biasing said release arm toward active position when said second rotatable member is rotating.

12. A safety coupling according to claim 4, in which the center of mass of said annular member is located eccentrically with respect to the pivot of said annular member to provide centrifugal force when said second rotatable member is rotated, said centrifugal force acting in a direction to disengage said nose portion from said abutment of said first rotatable member when said annular member is released by said first latch means.

13. A safety coupling according to claim 12, comprising spring means for biasing said annular member in a direction to move said nose portion to a position for engaging said abutment, the bias of said spring means being less than said centrifugal force when said second rotatable member is rotating at a speed above a selected value.

14. A safety coupling according to claim 1, comprising an actuating member movable between a release position for actuating said first latch means for movement of said pawl means to disengaged position and a reset position for actuating said second latch means for reengagement of said pawl means with said abutment.

* * * * *